United States Patent
Brindoepke et al.

(12) 
(10) Patent No.: US 6,284,321 B1
(45) Date of Patent: Sep. 4, 2001

(54) UNSATURATED POLYESTERURETHANE ACRYLATES AS BINDERS FOR POWDER COATINGS

(75) Inventors: Gerhard Brindoepke, Sulzbach; Dietmar Fink, Taunusstein, both of (DE)

(73) Assignee: Solutia Germany GmbH & Co. KG, Mainz-Kastel (DE)

( * ) Notice: Subject to any disclaimer, the term of this patent is extended or adjusted under 35 U.S.C. 154(b) by 0 days.

(21) Appl. No.: 09/433,314

(22) Filed: Nov. 3, 1999

Related U.S. Application Data

(63) Continuation of application No. 08/523,802, filed on Sep. 5, 1995, now abandoned.

(30) Foreign Application Priority Data

Sep. 14, 1994 (DE) ................................. 44 32 644

(51) Int. Cl.[7] .............................. B05D 1/12; C08L 75/06; C08L 75/14; C08L 75/16
(52) U.S. Cl. ..................... 427/385.5; 427/388.1; 427/388.2; 427/389.7; 427/389.9; 427/391; 427/393; 427/393.5; 427/493; 427/508; 427/520; 522/90; 522/93; 522/98; 522/174; 525/123; 525/126; 525/131; 525/440; 525/920; 528/49; 528/75; 528/80; 528/83
(58) Field of Search ................ 427/385.5, 388.1, 427/388.2, 389.7, 389.9, 391, 393, 393.5, 493, 508, 520; 522/90, 93, 98, 174; 525/123, 126, 131, 440, 920; 528/75, 80, 83, 49

(56) References Cited

U.S. PATENT DOCUMENTS

| | | | |
|---|---|---|---|
| 3,124,605 | 4/1958 | Wagner | 560/335 |
| 3,183,112 | 5/1965 | Gemassmer | 106/316 |
| 3,689,310 | 9/1972 | Johnson et al. | 528/75 |
| 3,919,218 | 11/1975 | Schmitt et al. | 544/222 |
| 3,954,715 | 5/1976 | Fang | 525/518 |
| 4,051,085 | 9/1977 | Hess et al. | 528/75 |
| 4,093,674 * | 6/1978 | Tsutsui et al. | 525/124 |
| 4,150,211 * | 4/1979 | Muller et al. | 528/45 |
| 4,164,486 | 8/1979 | Kudo et al. | 528/75 |
| 4,172,060 | 10/1979 | Dalidor et al. | 528/75 |
| 4,324,879 | 4/1982 | Bock | 528/45 |
| 4,377,679 | 3/1983 | Schmidle | 528/75 |
| 4,390,662 | 6/1983 | Ando et al. | 525/28 |
| 4,404,320 * | 9/1983 | Goto et al. | 525/58 |
| 4,965,294 | 10/1990 | Ohngemach et al. | 522/79 |
| 5,068,305 | 11/1991 | Meixner et al. | 528/49 |
| 5,384,358 | 1/1995 | Wamprecht et al. | 525/28 |
| 5,620,751 * | 4/1997 | Brindoepke et al. | 427/506 |

FOREIGN PATENT DOCUMENTS

| | | |
|---|---|---|
| 0 585 742 | 3/1994 | (EP) . |
| 2695935 | 3/1994 | (FR) . |
| 42 28 514 | 3/1994 | (DE) . |
| 1234684 | 6/1971 | (GB) . |

* cited by examiner

Primary Examiner—Rabon Sergent
(74) Attorney, Agent, or Firm—Foley & Lardner

(57) ABSTRACT

Binders for powder coatings are disclosed that contain, solid, unsaturated polyesterurethane (meth)acrylates having a melting temperature of from 35 to 180° C.

14 Claims, No Drawings

UNSATURATED POLYESTERURETHANE ACRYLATES AS BINDERS FOR POWDER COATINGS

This application is a continuation of application Ser. No. 08/523,802, filed Sep. 5, 1995 now abandoned which claims priority to DE P44 32 644.0 filed Sep. 14, 1994.

BACKGROUND OF THE INVENTION

The present invention relates to binders for powder coatings, and to processing powder coatings that contain the binders.

EP 410 242 discloses polyurethanes containing (meth) acryloyl groups, which are prepared by reacting (A) from 40 to 80 parts of an organic polyisocyanate with (B) from 15 to 50 parts of a (meth)acryloyl-containing monohydric alcohol and (C) from 2 to 20 parts of a further structural component consisting of at least one (meth)acryloyl-free compound containing groups which are reactive toward isocyanate groups.

These polyurethanes are used as binders in powder coatings. The blocking stability of these coating materials, however, is in many cases inadequate. EP 0 585 742 discloses that the blocking stability of coating materials based on these polyurethanes can be improved by blending them with solid, unsaturated polyesters. These polyesters are cheaper than the polyurethanes mentioned. By replacing a portion of the polyurethanes with the unsaturated polyesters, there is an overall reduction in cost for the powder coatings. With these powder coatings it is possible to coat even temperature-sensitive substrates, such as wood, wood materials and plastics, since they can be cured even at low temperatures by UV irradiation or by the addition of peroxides.

It is desirable for these powder coatings to flow just as well and to give surfaces that are just as smooth at this reduced baking temperature as conventional powder coatings. The binders must therefore exhibit good flow even at minimal processing temperatures. For this purpose, it is common to add flow additives, which markedly reduce the melt viscosity of the binder. However, these products do not take part in the curing reaction. This impairs the resistance of the coating to chemicals.

In a simultaneously filed U.S. patent application corresponding to German priority application P 44 32 645.9, this object is achieved by the addition of reactive, solid flow agents.

In powder coatings, it is not possible to reduce the melt viscosity to any desired extent, since in many cases the melting temperature decreases at the same time. During storage, the powder coatings thus formulated begin to agglomerate. The powder coating can then no longer be processed.

SUMMARY OF THE INVENTION

It is therefore an object of the present invention to provide powder coating binders which can be cured by UV irradiation or by addition of peroxides and which, additionally, have improved flow properties, without the powder coatings formulated from these binders losing their stability during storage.

The invention provides binders for powder coatings, comprising solid, unsaturated polyesterurethane acrylates, having a melting temperature of from 35 to 180° C., which are obtained by reacting an unsaturated, hydroxyl-containing polyester A which is solid at room temperature with a polyisocyanate B and with a hydroxyalkyl (meth) acrylate C.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

It has now been found that solid, unsaturated polyesterurethane acrylates flow in to smooth films even at low temperatures without agglomeration problems occurring in the course of storage.

According to the present invention, suitable unsaturated, hydroxyl-containing polyesters A are those which contain as functional groups predominantly hydroxyl groups and, in addition, carboxyl groups. The content of hydroxyl groups corresponds to OH numbers between 10 and 200 mg of KOH/g, in particular between 20 and 150 mg of KOH/g. On average, each polyester molecule should possess at least one hydroxyl group. The acid numbers of the polyesters are between 2 and 60, preferably between 2 and 30, mg of KOH/g. The viscosity of polyesters A according to the invention in the melt at 200° C. is less than 100,000 mPa·s, in particular less than 40,000 mPa·s.

The unsaturated, hydroxyl-containing, solid polyesters A are prepared by the condensation, which is known per se, of polyhydric alcohols and unsaturated dicarboxylic acids, their anhydrides or a mixture of acids and anhydrides, and, if desired, saturated carboxylic acids as well. If desired, it is also possible to employ esters of these carboxylic acids with alcohols, which are volatile under the condensation conditions (e.g., methyl esters), or half-esters of polyhydric alcohols (e.g., glycol esters). The content by mass of (olefinically unsaturated) alkene groups (calculated as —C=C— group) in the polyester A should be from 2 to 20%, preferably from 2 to 15%, in particular from 2 to 10%.

Suitable unsaturated dicarboxylic acids are, in particular, maleic acid, citraconic acid, itaconic acid and their anhydrides, fumaric acid and mesaconic acid. The saturated carboxylic acids may be aliphatic, cycloaliphatic, aromatic and/or heterocyclic mono-, di- or polycarboxylic acids and may be substituted, for example by halogen atoms. Preference is given to dicarboxylic acids and/or their anhydrides. Examples of these are include: dicarboxylic acids such as succinic acid, adipic acid, suberic acid, azelaic acid, sebacic acid, phthalic acid, terephthalic acid, isophthalic acid, tetrahydrophthalic acid, hexahydrophthalic acid, di- and tetrachlorophthalic acid, endomethylenetetrahydrophthalic acid and its hexachloro derivative, glutaric acid, dimethyl terephthalate, bisglycol terephthalate; monocarboxylic acids such as dimethylolpropionic acid, benzoic acid, p-tert-butylbenzoic acid or hexahydrobenzoic acid; polycarboxylic acids such as trimellitic acid and pyromellitic acid; and also dimeric and trimeric fatty acids, for example those derived from oleic acid, if desired as a mixture with monomeric fatty acids.

Suitable polyhydric alcohols are diols, triols and polyols containing four or more hydroxyl groups. These may be linear or branched aliphatic compounds or may be mixed aromatic/aliphatic. Preference is given to ethylene glycol, 1,2- and 1,3-propylene glycol, 1,4- and 2,3-butylene glycol, 1,4-butenediol, di-β-hydroxyethylbutanediol, 1,6-hexanediol, 1,8-octanediol, neopentylglycol, 2,2-bis(4-(β-hydroxyethoxy)phenyl)propane, 2-methyl-1,3-propanediol, xylylene glycol and the polyols glycerol, trimethylolpropane, 1,2,6-hexanetriol, 1,2,4-butanetriol, tris (β-hydroxyethyl) isocyanurate, trimethylolethane, pentaerythritol, quinitol, mannitol and sorbitol, formose and its hydroxyalkylation products, methyl glycosides, and also the oligo and polyoxyalkylene glycols such as diethylene glycol, triethylene glycol, tetraethylene glycol, polyethylene glycols, dipropylene glycol, tripropylene glycol, polypropylene glycols, dibutylene glycol, ethoxylated or propoxylated butenediol and polybutylene glycols. It is also possible to employ mono- and polyesters of lactones, for example ε-caprolactone or hydroxycarboxylic acids, for example hydroxypivalic acid, ω-hydroxydecanoic acid or ε-hydroxycaproic acid; polyesters of the above-mentioned polycarboxylic acids and/or their derivatives, and polyphenols, such as hydroquinone, bisphenol-A, 4,4'-dihydroxybiphenyl or bis(4-hydroxyphenyl)sulfone; fatty acid-modified polyesters (oil alkyds) and naturally occurring saturated or unsaturated polyesters, their degradation products or transesterification products with polyols, such as castor oil, tallow oil, soya oil or linseed oil; polyesters of carbonic acid which are obtainable from hydroquinone, diphenylolpropane, p-xylylene glycol, ethylene glycol, butanediol or 1,6-hexanediol and other polyols by customary condensation reactions, for example with phosgene or with diethyl carbonate or diphenyl carbonate, or from cyclic carbonates, such as glycol carbonate or vinylidene carbonate, by addition polymerization in a manner known per se.

Further examples of suitable polyesters A are the reaction products of dicarboxylic acids and glycidyl compounds, as are described, for example, in DE 24 10 513. Examples of glycidyl compounds which can be used for this purpose are esters of 2,3-epoxy-1-propanol with monobasic acids having from 4 to 18 carbon atoms, such as glycidyl palmitate, glycidyl laurate and glycidyl stearate or the glycidyl ester of a mixture of neononanoic, neodecanoic and neoundecanoic acids, which is commercially available under the name ®Cardura E10 (Shell Chemicals); alkylene oxides having from 4 to 18 carbon atoms, such as butylene oxide, and glycidyl ethers, such as octylene glycidyl ether. Dicarboxylic acids which can be used in this context are all of the above-listed dicarboxylic acids.

Other preferred components are monomeric esters, for example, bis(hydroxyalkyl) dicarboxylates, monocarboxylic esters of more than dihydric polyols, and oligoesters which can be prepared by condensation reactions of raw materials which are customary in the chemistry of surface coatings.

The unsaturated, hydroxyl-containing polyesters A can be obtained in a manner known per se by condensation in an inert gas atmosphere at temperatures of from 100 to 260° C., preferably from 130 to 240° C., in the melt or in an azeotropic procedure, as is described, for example, in Methoden der Organischen Chemie [Methods of Organic Chemistry] (Houben-Weyl), Vol. 14/2, pages 1 to 5, 21 to 23 and 40 to 44, Georg Thieme Verlag, Stuttgart, 1963 or in C. R. Martens, Alkyd Resins, pages 51 to 59, Reinhold Plastics Appl. Series, Reinhold Publishing Comp., New York, 1961. The contents of these and all other references mentioned herein are incorporated in their entirety.

For the reaction with this hydroxyl-containing, unsaturated polyester A, suitable polyisocyanates B are any desired organic polyisocyanates which are known from polyurethane chemistry, which contain isocyanate groups attached to aliphatic, cycloaliphatic and/or aromatic structures and which have a molecular mass of from 150 to 1500 g/mol, preferably from 168 to 800 g/mol. Suitable examples are 1-isocyanato-3,3,5-trimethyl-5-isocyanatomethylcyclohexane (isophorone diisocyanate, IPDI), tetramethylxylylene diisocyanate (TMXDI), hexamethylene diisocyanate (HDI), trimethylhexamethylene diisocyanate, 4,4'-diisocyanatodicyclohexylmethane, 4,4'-diisocyanatodiphenylmethane, its technical-grade mixtures with 2,4-diisocyanatodiphenylmethane and, if desired, with the higher homologs of these diisocyanates, 2,4-diisocyanatotoluene and its technical-grade mixtures with 2,6-diisocyanatotoleune, and copolymers of α,α'-dimethyl-metaisopropenylbenzyl isocyanate (TMI).

Also suitable are biuret, isocyanurate, urethane- or urea-modified polyisocyanates based on these simple polyisocyanates, and the dimeric uretdiones and trimeric isocyanurates. These derivatives generally have a molecular mass of up to about 1000 g/mol. The preparation of such derivatives is described in, for example, U.S. Pat. No. 3,124,605, U.S. Pat. No. 3,183,112, U.S. Pat. No. 3,919,218 or U.S. Pat. No. 4,324,879.

As component B it is preferred to use 2,4-diisocyanatotoluene or its technical-grade mixtures with up to 35%, based on the mass of the mixture, of 2,6-diisocyanatotoluene, IPDI, TMXDI and/or polyisocyanates obtained by di- or trimerization of IPDI, TMXDI or HDI.

The hydroxyalkyl (meth)acrylate C which is suitable for the reaction with the polyisocyanate B and with the unsaturated hydroxyl-containing polyester A comprises at least one (meth)acryloyl-containing, mono- or polyhydric alcohol. Such compounds include, in particular, hydroxyalkyl esters of acrylic acid or methacrylic acid having preferably from 2 to 4 carbon atoms in the hydroxyalkyl radical, such as hydroxyethyl (meth)acrylate, 2- and 3-hydroxypropyl (meth)acrylate, 2-, 3- and 4-hydroxybutyl (meth)acrylate. It is also possible to use reaction products of these hydroxyalkyl acrylates with ε-caprolactone.

In addition, it also is possible to use reaction products of acrylic acid with di- or polyepoxides, for example, the diglycidyl ethers of bisphenol A or F, of hexanediol, butanediol or neopentylglycol and of cyclohexane dimethanol. Also suitable are esters of acrylic or methacrylic acid with polyhydric alcohols, such as trihydric, tetrahydric or pentahydric alcohols, where on average at least one hydroxyl group of the polyhydric alcohol must remain unesterfied. Examples of such compounds then have a chain-extending action. Also suitable are trimethylolpropane diacrylate or pentaerythritol triacrylate.

In the course of the preparation of the binder according to the invention from the hydroxyl-containing polyester A, the polyisocyanate B and the hydroxyalkyl (meth)acrylate C it is possible, in order to obtain desired properties, to employ minor amounts of components which are reactive toward isocyanate groups, for example, triols such as glycerol or trimethylolpropane, or polyamines. Suitable polyamines are aliphatic linear or branched or cycloaliphatic diamines or polyalkylenepolyamines, for example, ethylenediamine, propylenediamine, 2-methylpentamethylenediamine, hexamethylenediamine, trimethylhexamethylenediamine, neopentyldiamine, octamethylenediamine or triacetonediamine, and oligomer polyethyleneamines such as diethylenetriamine or triethylenetetramine.

The preparation of the solid, unsaturated polyesterurethane acrylates is carried out by reacting the abovementioned starting components in the melt or in inert solvents, such as, for example, acetone, ethyl acetate, butyl acetate or toluene, the reaction temperatures observed preferably being from 20 to 150° C., in particular 20 to 140° C. A preferred procedure is in a first reaction step, to prepare the unsaturated, hydroxyl-containing polyester A and, following dilution with the hydroxy (meth)acrylate C, to add the polyisocyanate component B. It is also possible, however, first to react the (meth)hydroxyalkyl acrylate C with the isocyanate component to give (meth)acryloyl-containing urethanes with isocyanate end groups. These products are then reacted, in a second step, with the unsaturated polyester.

The reaction generally is continued until the content of free isocyanate is below 0.3%, and then the product is isolated, if the procedure has been carried out in solution, by distillative removal of the solvent or, if it has been carried out in the melt, by allowing the melt to solidify.

It also has proven advantageous, as in the parallel-filed U.S. application corresponding to German priority application P 44 32 645.9, to use solid, reactive mono or diacrylates as solid solvents during the preparation, since it is thereby possible to improve the ease of preparation and to lower further the viscosity of the product.

The addition reaction which leads to the solid, unsaturated polyesterurethane acrylate can be accelerated in a manner known per se by means of appropriate catalysts, for example, tin octoate, dibutyltin dilaurate or tertiary amines such as dimethylbenzylamine. The unsaturated polyesterurethane obtained as a reaction product can, alternatively, be protected against premature and unwanted polymerization by addition of suitable inhibitors and antioxidants such as, for example, substituted phenols and/or hydroquinones in quantities of in each case from 0.001 to 0.3% based on the mass of the polyurethane. The addition of these auxiliaries can be made prior to, simultaneously with and/or following the reaction leading to the polyurethane.

The solid, unsaturated polyesterurethane (meth)acrylates have a melting point in the temperature range from 35 to 180° C. and have a content by mass of olefinic double bonds in the form of (meth)acryloyl groups (calculated as —C═C—, molecular mass=24 g/mol) of from 0.5 to 8%.

The polyesterurethane (meth)acrylates are prepared by reacting the abovementioned starting components and in accordance with the abovementioned methods. The qualitative and quantitative ratios of these starting components preferably are chosen so as to result in virtually isocyanate-free, unsaturated polyesterurethane (meth)acrylates having a number-average molecular mass of from 400 to 20,000 g/mol.

The solid, (meth)acryloyl-containing, unsaturated polyesterurethane acrylates obtained in this way result in variable binders for powder coatings. They can be processed without further additives as heat- or as radiation-crosslinkable powder clearcoats (in which case the binder would be identical with the coating composition) or else, preferably, together with the customary auxiliaries and additives from surface-coating technology, pigments, such as, for example, titanium dioxide, additional flow agents, for example, polybutyl acrylate or silicones, and other additives. These mixtures are homogenized in an extruder or kneading apparatus at temperatures of from about 70 to 140° C., preferably from 80 to 120° C., and are then solidified by cooling. The solid obtained in this process is then ground in a manner known per se and is screened to remove coarse particle fractions, preferably at least those having a particle size of above 0.1 mm.

The pulverulent coating compositions produced in this way can be applied to the shaped articles to be coated by customary powder application methods, for example, by electrostatic powder spraying or fluidized-bed sintering. In the case of wood as a substrate, for example, a conductivity auxiliary may also be applied prior to electrostatic spraying. In general, these binders are suitable for both cold and hot coating. In the case of substrates of large surface area, such as, for example, wooden or metal boards or paper webs, vertical coating is also possible without the occurrence of any caking of the powder. In this process, it may also be possible under certain circumstances to dispense with electrostatic spraying. The coating compositions according to the invention can be used for the coating of substrates such as wood, glass, metal, paper or plastic.

The coatings are cured by heating at temperatures of from 90 to 220° C., preferably from 120 to 190° C. (if a free-radical initiator, for example a peroxide, has been added to the powder coating), or by the action of high-energy radiation such as UV rays or electron beams.

In the case of thermal crosslinking, in order to accelerate the curing reaction it is preferred to add a free-radical initiator, i.e., a compound which forms radicals by decomposition at elevated temperature. These radicals initiate the polymerization reaction. Suitable compounds are those which are customarily employed for the thermally induced polymerization of vinyl compounds such as styrene or acrylic polymers, examples being organic peroxides, peresters and hydroperoxides, and aliphatic azo compounds. The selection is made such that the rate of decomposition of the free-radical initiator at the curing temperature is sufficiently high. Suitable free-radical initiators fcr the purpose of this invention are, for example, di-tert-butyl peroxide, diisopropyl percarbonate, cumene hydroperoxide, azobisisobutyronitrile, azobiscyclobutanenitrile and azobiscyanocyclohexane.

In the case of crosslinking by means of UV irradiation it is necessary to add photoinitiators to the coating compositions prior to homogenization. Suitable photoinitiators are the compounds which are customarily employed, as are described, for example, in the monograph by J. Kosar, "Light-Sensitive Systems", J. Wiley & Sons, New York-London or in "UV & EB Curing Formulations for Printing Inks, Coatings and Paints", ISBN 0 947798 02 1 or in DE-A 38 15 622.

If it is desired to obtain very smooth coatings or to powder-coat heat-sensitive material, an alternative procedure which is very advantageous is one in which the applied powder is first of all melted superficially, using an IR lamp, until the material has flowed. In a second step, this powder coating melt then can be cured by means of UV light or electron beams.

Suitable photoinitiators are, in particular, those compounds which are present in free form and can be powdered. Examples of these are 1-hydroxycyclohexyl phenyl ketone, benzil dimethyl ketal or, in the case of pigmented systems, 2-methyl-1-[4-(methylthio)phenyl]-2 morpholino-propan-1-ol or trimethylbenzoyldiphenylphosphine oxide. Further highly suitable compounds are benzoin ethers such as benzoin isopropyl ether, benzil ketals, such as benzil dimethyl ketal, and hydroxyalkylphenols, such as 2-hydroxy-2-methyl-1-phenylpropan-1-one.

The photoinitiators may be employed in amounts of from 0.1 to 10%, preferably from 0.1 to 5%, based on the mass of the binder. They may be used as individual substances or alternatively, owing to frequent, advantageous synergistic effects, in combination with one another.

If curing is carried out with the aid of electron beams, the energy of these beams is customarily between 50 and 500 keV.

In the examples which follow, all parts and percentages should be understood as contents or proportions by mass.

EXAMPLE 1

Amounts of 445 parts of neopentylglycol, 398 parts of terephthalic acid and 1.5 parts of dibutyltin oxide are heated on a water separator at from 190 to 220° C. After the terephthalic acid has completely dissolved, the mixture is cooled to 160° C., and 98 parts of maleic anhydride and 0.2 part of hydroquinone are added. The mixture is then heated slowly again to from 195 to 200° C. and is stirred at this temperature until an acid number of below 25 mg of KOH/g has been reached. After low molecular weight volatile oligomers have been distilled off in vacuo, the mixture is cooled to give a clear, solid, unsaturated polyester which has an acid number of 12 mg of KOH/g, a hydroxyl number of 106 mg of KOH/g and a number-average molecular mass of 2800 g/mol.

Next, 520 parts of this polyester is dissolved in 71.5 parts of 2-hydroxypropyl acrylate, while heating, stirring and passing in air, and 1 g of hydroquinone monomethyl ether and 0.2 g of dibutyltin dilaurate are added. Subsequently, 177 parts of isophorone diisocyanate are added dropwise at 120° C. over the course of 1 h. The mixture is then stirred until an isocyanate content of less than 0.3% has been reached, and the resin melt is then left in a pan to solidify. A light-colored, clear, solid resin is obtained which has an OH number of 10 mg of KOH/g, a glass transition temperature of 46° C. and an average molecular mass of 8500 g/mol.

Then, 465 parts of this unsaturated polyesterurethane acrylate are mixed with 20 parts of Irgacure® 651 (commercial photoinitiator from Ciba-Geigy) and with 15 parts of Additol® XL 496 (commercial flow agent from Hoechst AG) and the mixture is extruded and ground to give a powder having an average particle size of 40 μm.

Following application to cleaned iron panels, the coating films are melted with an IR lamp and then irradiated with a UV lamp (80 W, 10 cm, 10 m/min). A solvent-resistant, hard, scratch-resistant coating is obtained.

EXAMPLE 2

Amounts of 440 parts of neopentylglycol, 382 parts of terephthalic acid and 0.5 part of dibutyltin oxide are heated on a water separator at from 190 to 220° C. After the terephthalic acid has completely dissolved, the mixture is cooled to 160° C., and 98 parts of maleic anhydride, 36 parts of p-tert-butylbenzoic acid and 0.1 part of hydroquinone are added. The mixture is then heated slowly again to from 195 to 200° C. and is stirred at this temperature until an acid number of below 20 mg of KOH/g has been reached. After low molecular weight volatile oligomers have been distilled off in vacuo, the mixture is cooled to give a clear, solid, unsaturated polyester which has an acid number of 15 mg of KOH/g, a hydroxyl number of 110 mg of KOH/g and a number-average molecular mass of 2900 g/mol.

Then, 510 parts of this polyester are dissolved in 72 parts of 2-hydroxypropyl acrylate, while heating, stirring and passing in air, and 1 g of hydroquinone monomethyl ether and 0.2 g of dibutyltin dilaurate are added. Subsequently, 180 parts of isophorone diisocyanate are added dropwise at 120° C. over the course of 1 h. The mixture is then stirred until an isocyanate content of less than 0.3% has been reached, and the resin melt is then left in a pan to solidify. A light-colored, clear, solid resin is obtained which has an OH number of 12 mg of KOH/g, a glass transition temperature of 43° C. and an average molecular mass of 9900 g/mol.

Next, 465 parts of this unsaturated polyesterurethane acrylate are mixed with 20 parts of Irgacure® 651 (commercial photoinitiator from Ciba-Geigy) and with 15 parts of Additol® XL 496 (commercial flow agent from Hoechst AG) and the mixture is extruded and ground to give a powder having an average particle size of 40 μm.

Following application to cleaned iron panels, the coating films are melted with an IR lamp and then irradiated with a UV lamp (80 W, 10 cm, 10 m/min). A solvent-resistant, hard, scratch-resistant coating is obtained.

What is claimed is:

1. A method of coating a shaped article, comprising coating a shaped article with a pulverulent coating composition comprising a solid, unsaturated polyesterurethane (meth)acrylate having a content by mass of olefinic double bonds in the form of (meth)acryloyl groups, calculated as —C=C—, molecular mass 24 g/mol, of from 0.5 to 8%, and a melting temperature of from 35 to 180° C., which is obtained by reacting a polyisocyanate B with a mixture of an unsaturated hydroxyl-containing polyester A which has a content by mass of olefinically unsaturated groups of from 2 to 20% and which is solid at room temperature, and a hydroxyalkyl(meth)acrylate C.

2. A method of coating as claimed in claim 1, wherein component A comprises a condensation product of a polyhydric alcohol and unsaturated dicarboxylic acids, their anhydrides or mixtures of these, and, optionally, saturated carboxylic acids.

3. A method of coating as claimed in claim 2, wherein component A is prepared from one or more of the saturated dicarboxylic acids selected from the group consisting of terephthalic acid and isophthalic acid.

4. A method of coating as claimed in claim 1, wherein component A has a hydroxyl number of from 10 to 200 mg of KOH/g, an acid number of from 2 to 60 mg of KOH/g, a viscosity of less than 100,000 mPa·s, and a melting point of from 50 to 130° C.

5. A method of coating as claimed in claim 1, wherein the hydroxyl-containing, unsaturated polyester A has an acid number in the range of from greater than 12 to 60.

6. A method of coating as claimed in claim 1, wherein component A is prepared from one or more unsaturated dicarboxylic acids selected from the group consisting of maleic acid and fumaric acid.

7. A method of coating as claimed in claim 1, wherein component A is prepared from one or more polyhydric alcohols selected from the group consisting of neopentylglycol, ethylene glycol, diethylene glycol, trimethylolpropane and glycerol.

8. A method of coating as claimed in claim 1, wherein component B comprises one or more polyisocyanates selected from the group consisting of isophorone diisocyanate, tetramethylxylylene diisocyanate, diphenylmethane diisocyanate, dicyclohexylmethane diisocyanate and tolylene diisocyanate and the isocyanate-containing dimers (uretdiones) and trimers (isocyanurates) thereof.

9. A method of coating as claimed in claim 1, wherein component C comprises one or more compounds selected from the group consisting of hydroxyethyl acrylate, hydroxypropyl acrylate, hydroxybutyl acrylate, trimethylolpropane diacrylate, pentaerythritol triacrylate, hydroxyethyl (meth)acrylate, hydroxypropyl (meth)acrylate, hydroxybutyl (meth)acrylate, trimethylolpropane di(meth)acrylate, pentaerythritol tri(meth)acrylate, the reaction products of these (meth)acrylates with, ε-caprolactone and the reaction products of (meth)acrylic acid with an epoxide-containing compound.

10. A method of coating as claimed in claim 1, wherein the coating composition additionally comprises one or more photoinitators in a quantity of from 0.1 to 10%, based on the mass of the coating composition.

11. A method of coating as claimed in claim 1, further comprising curing the coating thermally or by irradiation with UV light or electron beams.

12. A method as claimed in claim 11, further comprising melting the powder coating prior to curing by irradiation with infrared light on the shaped article.

13. A method as claim in claim 12, wherein the shaped article is selected from the group consisting of wood, glass, plastic, metal, paper and mixtures thereof.

14. A method of coating as claimed in claim 1, wherein the solid, unsaturated polyester urethane (meth)acrylate is made by dissolving a hydroxyl-containing unsaturated polyester A in a hydroxyalkyl (meth)acrylate C to form a first mixture, adding a polyisocyanate B to said first mixture to form a second mixture, and reacting said second mixture until the isocyanate content has fallen below 0.3%.

* * * * *